US012684012B2

(12) United States Patent
Randolph et al.

(10) Patent No.: US 12,684,012 B2
(45) Date of Patent: Jul. 14, 2026

(54) METHOD AND APPARATUS FOR SNAPSHOT MANAGEMENT

(71) Applicant: Dell Products L.P., Round Rock, TX (US)

(72) Inventors: Benjamin A. Randolph, Uxbridge, MA (US); Jeremy O'Hare, Westborough, MA (US); Bruce Ferjulian, Hudson, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 18/889,458

(22) Filed: Sep. 19, 2024

(65) Prior Publication Data

US 2026/0081951 A1     Mar. 19, 2026

(51) Int. Cl.
*H04L 9/40* (2022.01)
(52) U.S. Cl.
CPC .................................. *H04L 63/145* (2013.01)
(58) Field of Classification Search
CPC ...................................................... H04L 63/145
See application file for complete search history.

(56) References Cited

U.S. PATENT DOCUMENTS

| | | | | |
|---|---|---|---|---|
| 10,318,733 | B2 * | 6/2019 | Lemay .................. | H04L 63/145 |
| 10,853,185 | B1 * | 12/2020 | Guo ..................... | G06F 11/1453 |
| 11,113,086 | B1 * | 9/2021 | Steinberg ............. | G06F 9/45558 |
| 12,387,272 | B1 * | 8/2025 | Thomas ................. | G06Q 40/08 |
| 2022/0035905 | A1 * | 2/2022 | Lu ............................ | G06F 21/56 |
| 2024/0311472 | A1 * | 9/2024 | Zhang .................... | G06F 21/554 |
| 2025/0356009 | A1 * | 11/2025 | Gee ....................... | G06F 11/1469 |

* cited by examiner

*Primary Examiner* — Linglan Edwards
*Assistant Examiner* — Jacob Benedict Knackstedt
(74) *Attorney, Agent, or Firm* — Daly, Crowley, Mofford & Durkee, LLP

(57) ABSTRACT

A method, comprising: executing an embedded malware detector, the embedded malware detector being executed inside a first guest operating system, the first guest operating system being executed on a storage processor that is part of a storage system, the storage processor being configured to execute one or more second guest operating systems in addition to the first guest operating system, each of the second guest operating systems being arranged to execute software for reading and/or writing data to one or more storage devices that are provided in the storage system; identifying, by the embedded malware detector, a given one of the storage devices; obtaining, by the embedded malware detector, a snapshot of the given one of the storage devices; mounting, by the embedded malware detector, the snapshot in the first guest operating system; scanning the mounted snapshot for malware.

16 Claims, 4 Drawing Sheets

PRIMARY STORAGE SYSTEM 133

| STORAGE PROC.<br>202A | STORAGE PROC.<br>202B | • • • • | STORAGE PROC.<br>202N |
| STORAGE DEVICE<br>204A | STORAGE DEVICE<br>204B | • • • • | STORAGE DEVICE<br>204M |

| PROCESSOR<br>302 | VOLATILE MEMORY<br>304 | INPUT/OUTPUT (I/O)<br>DEVICE 320 |

NON-VOLATILE MEMORY 306

COMPUTER INSTRUCTIONS
312

OPERATING SYSTEM 316

DATA 318

GUI

308

300

METHOD AND APPARATUS FOR SNAPSHOT MANAGEMENT

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: executing an embedded malware detector, the embedded malware detector being executed inside a first guest operating system, the first guest operating system being executed on a storage processor that is part of a storage system, the storage processor being configured to execute one or more second guest operating systems in addition to the first guest operating system, each of the second guest operating systems being arranged to execute software for reading and/or writing data to one or more storage devices that are provided in the storage system; identifying, by the embedded malware detector, a given one of the storage devices; obtaining, by the embedded malware detector, a snapshot of the given one of the storage devices; mounting, by the embedded malware detector, the snapshot in the first guest operating system; scanning the mounted snapshot for malware, the snapshot being scanned by using the embedded malware detector; and outputting an indication of whether any malware was detected in the mounted snapshot as a result of the scanning.

According to aspects of the disclosure, a storage processor is provided that is part of a storage system, the storage system being configured to provide one or more storage devices, comprising: a memory; and at least one processor that is operatively coupled to the memory, the at least one processor being configured to perform the operations of: executing an embedded malware detector inside a first guest operating system, the first guest operating system being executed on the storage processor together with one or more second guest operating systems, each of the second guest operating systems being arranged to execute software for reading and/or writing data to one or more storage devices that are provided in the storage system; identifying, by the embedded malware detector, a given one of the storage devices; obtaining, by the embedded malware detector, a snapshot of the given one of the storage devices; mounting, by the embedded malware detector, the snapshot in the first guest operating system; scanning the mounted snapshot for malware, the snapshot being scanned by using the embedded malware detector; and outputting an indication of whether any malware was detected in the mounted snapshot as a result of the scanning.

According to aspects of the disclosure, a non-transitory computer-readable medium is provided that stores one or more processor executable instructions, which, when executed by at least one processor of a storage processor, cause the at least one processor to perform the operations of: executing an embedded malware detector inside a first guest operating system, the first guest operating system being executed on the storage processor together with one or more second guest operating systems, each of the second guest operating systems being arranged to execute software for reading and/or writing data to one or more storage devices that are provided in a storage system; identifying, by the embedded malware detector, a given one of the storage devices; obtaining, by the embedded malware detector, a snapshot of the given one of the storage devices; mounting, by the embedded malware detector, the snapshot in the first guest operating system; scanning the mounted snapshot for malware, the snapshot being scanned by using the embedded malware detector; and outputting an indication of whether any malware was detected in the mounted snapshot as a result of the scanning.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Enterprise storage array customers prioritize cybersecurity threats, viewing them as a significant concern. Host-based anti-virus (AV) solutions are crucial in combating these threats but are increasingly vulnerable to compromise by malware. Most malware threats first disable any host-based antivirus, rendering scans ineffective. According to the MITRE™ organization, adversaries may modify and/or disable security tools by killing processes or services and modifying/deleting Registry keys or configuration files. This hinders the effectiveness of managing and eradicating malware from enterprise storage systems. Consequently, there is a need for alternative and/or complementary cybersecurity approaches to enhance data protection effectively.

The present disclosure addresses this need. According to aspects of the disclosure, an embedded container (e.g., see guest OS 418, shown in FIG. 4) residing within an enterprise storage array (e.g., see storage system 133, shown in FIG. 1) is granted read access to all data in the storage array. An embedded malware detector (e.g., see detector 419, shown in FIG. 4) is executed within the container. The embedded malware detector has the capability to capture a snapshot of every (or at least one) storage device that is hosted on the array's primary storage and subsequently mount the captured snapshot. The embedded malware detector may perform a comprehensive antivirus scan on each mounted storage device snapshot. The embedded malware detector may employ protective measures to shield itself from the effects of malware by preventing the execution of any executable code originating from the mounted snapshot. Upon detecting malicious files on the mounted snapshot of the storage device, the embedded malware detector may promptly notify a system administrator.

Figure 1:
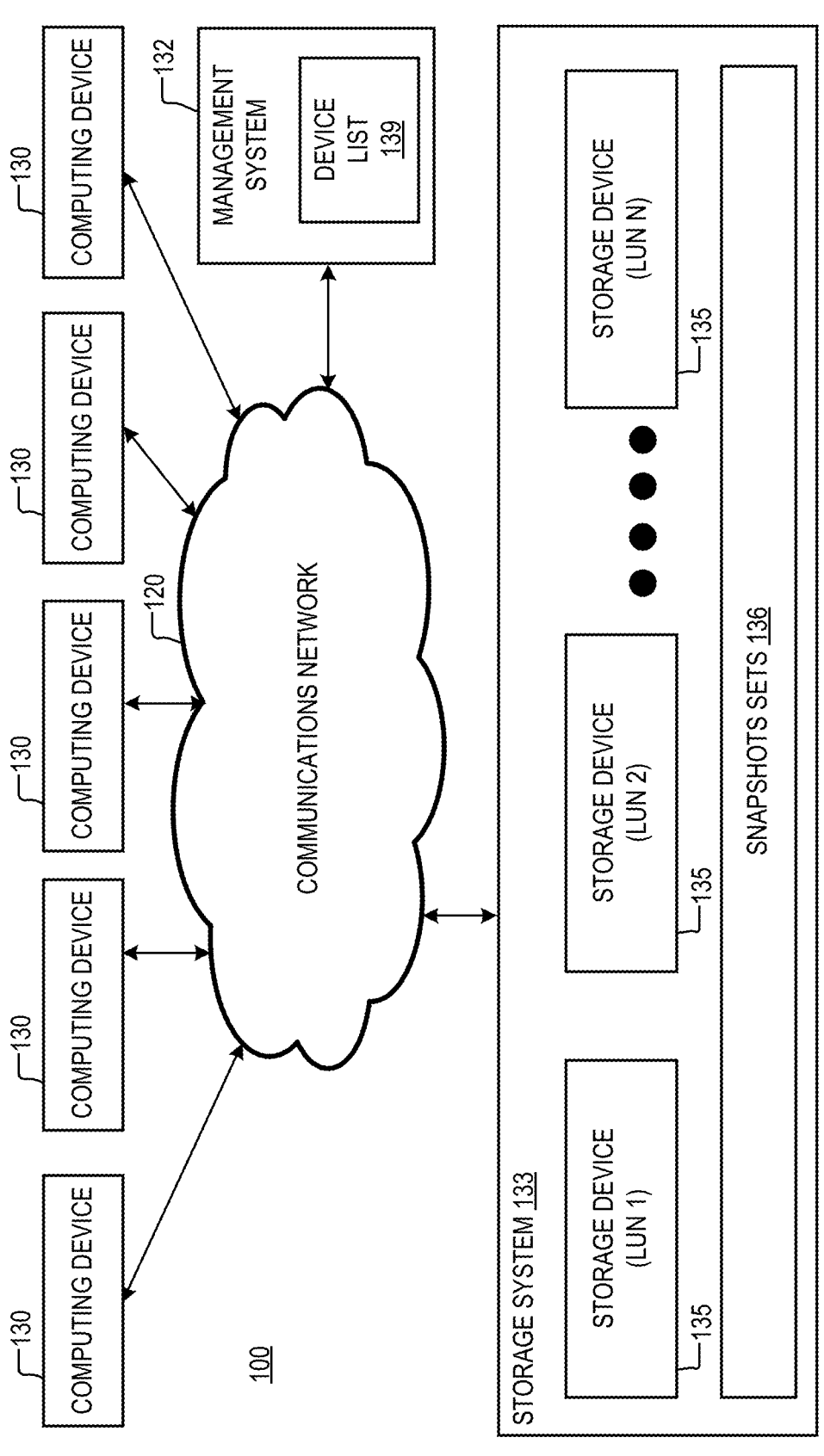
FIG. 1 is a diagram of an example of a system, according to aspects of the disclosure.

FIG. 1 is a diagram of an example of a system 100, according to aspects of the disclosure. As illustrated, system 100 may include a storage system 133 that is coupled to a plurality of computing devices 130 and a management system 132 via a communications network 120. Each of the computing devices 130 may include a smartphone, a desktop, a server, a laptop, and/or any other device that might be used by a user to store and retrieve data from the storage system 133. The communications network 120 may include one or more of the Internet, a local area network (LAN), a wide area network (WAN), an InfiniBand network, a mobile data network, etc.

Storage system 133 may be configured to implement a plurality of storage devices 135. Each of the storage devices 135 may be a virtual representation of a physical storage device or part of it. For example, any of the storage devices 135 may be a representation of one of: (i) an entire disk in storage system 133 (e.g., a hard disk (HD) or solid-state drive (SSD), etc.), (ii) a portion of the disk, (iii) an entire RAID set in storage system 133, (iv) a portion of the RAID set, etc. Each of the storage devices may be accorded a separate logical unit number (LUN). Each of the storage devices 135 may be written to or read from by one or more of the computing devices 130. Under the nomenclature of the present disclosure, the term "storage device" may refer to a virtual storage device, such as any of the storage devices 135 or to a physical storage device, such as an HD, an SSD, or a RAID set.

Storage system 133 may be configured to store a plurality of snapshot sets 136. Each of the snapshot sets 136 may include a plurality of snapshots of a different one of the storage devices 135. Each snapshot in any given one of the snapshot sets 136 may be an image (e.g., a read-only image) of the snapshot set's 136 corresponding storage device 135 at a particular point in time, and it may enable the system to revert to that precise state in the future. According to the present example, the snapshot sets 136 are created for data backup purposes in accordance with standard snapshot creation policies.

Figures 2, 3:
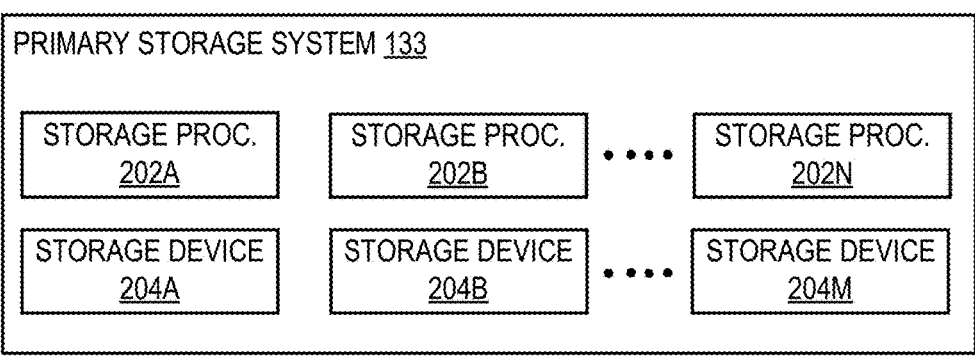
FIG. 2 is a diagram of an example of a storage system, according to aspects of the disclosure.
FIG. 3 is a diagram of an example of a computing device, according to aspects of the disclosure.

FIG. 2 shows an example of one possible configuration of the storage system 133, according to aspects of the disclosure. As illustrated, the storage system 133 may include a plurality of storage processors 202A-N and a plurality of storage devices 204A-M. In some implementations, each of the storage devices 204A-M may include a Solid-State Drive (SSD), a Non-Volatile Memory Express (NVME) device, a hard disk, and/or any other suitable type of storage device. The storage devices 204A-M may constitute the physical storage hardware that is used to implement storage devices 135. Each of the storage processors 202A-N may be configured to receive I/O requests from the computing devices 130 and fulfill those requests by reading or writing data to the storage devices 135. In some implementations, each of the storage processors 202A-N may include a computing device, such as the computing device 300, which is discussed further below with respect to FIG. 3. Additionally or alternatively, in some implementations, each of the storage processors 202 may be implemented in the manner discussed further below with respect to FIG. 4. Specifically, each of the of the storage processors 202 may be configured to execute an embedded malware detector 419 (shown in FIG. 4), which is arranged to scan the storage devices 135 for malware.

Returning to FIG. 1, the management system 132 may be configured to execute software (not shown) that is configured to initiate the creation of snapshots, including setting up snapshot policies scheduling automatic snapshots, and specifying the storage devices of which snapshots are to be created. In some implementations, the management system 132 may be configured to create snapshots according to a schedule or snapshot creation policy that is specified by a system administrator. In another aspect, the management system 132 may include an Application Programming Interface (API) which enables the management system 132 to receive a request to create a snapshot of a volume in storage system 133 and execute the request by causing the storage system 133 to create the snapshot. In response to the request, once the snapshot is created, the API may return a link to the snapshot. The link may include any suitable number, string, or alphanumerical string that identifies the snapshot and/or the storage location where the snapshot is stored. Management system 132 may be implemented by using one or more computing devices, such as the computing device 300, which is discussed further below with respect to FIG. 3.

In some implementations, the management system 132 may be configured to store a device list 139. List 139 may include the identifiers (e.g., LUNs) of one or more of the storage devices 135 that are desired to be scanned (e.g., periodically) by the embedded malware detector 419. In some implementations, the management system 132 may be configured to receive user input (e.g., from a system administrator) identifying the ones of storage devices 135 that are desired to be scanned and generate the list 139 based on the user input. Although, in the present example, the list 139 is stored in management system 132, alternative implementations are possible in which the list 139 is stored at a different location. Although, in the present example, list 139 identifies storage devices that are desired to be scanned, alternative implementations are possible in which list 139 identifies storage devices exempted from being scanned. In either case, list 139 may be used by the embedded malware detector 419 to identify which ones of the storage devices 135 need to be scanned. Although, in the present example, the list 139 identifies a plurality of storage devices 135, in some instances the list 139 may identify only one storage device 135. As used herein, the term "list of storage devices" shall refer to a set of one or more storage device identifiers. The storage device identifiers may be encapsulated in the same object or file or they may be stored separately. The present disclosure is not limited to any specific implementation of the list 139.

Referring to FIG. 3, in some embodiments, a device 300 may include processor 302, volatile memory 304 (e.g., RAM), non-volatile memory 306 (e.g., a hard disk drive, a solid-state drive such as a flash drive, a hybrid magnetic and solid-state drive, etc.), graphical user interface (GUI) 308 (e.g., a touchscreen, a display, and so forth) and input/output (I/O) device 320 (e.g., a mouse, a keyboard, etc.). Non-volatile memory 306 stores computer instructions 312, an operating system 316 and data 318 such that, for example, the computer instructions 312 are executed by the processor 302 out of volatile memory 304. Program code may be applied to data entered using an input device of GUI 308 or received from I/O device 320.

Figure 4:
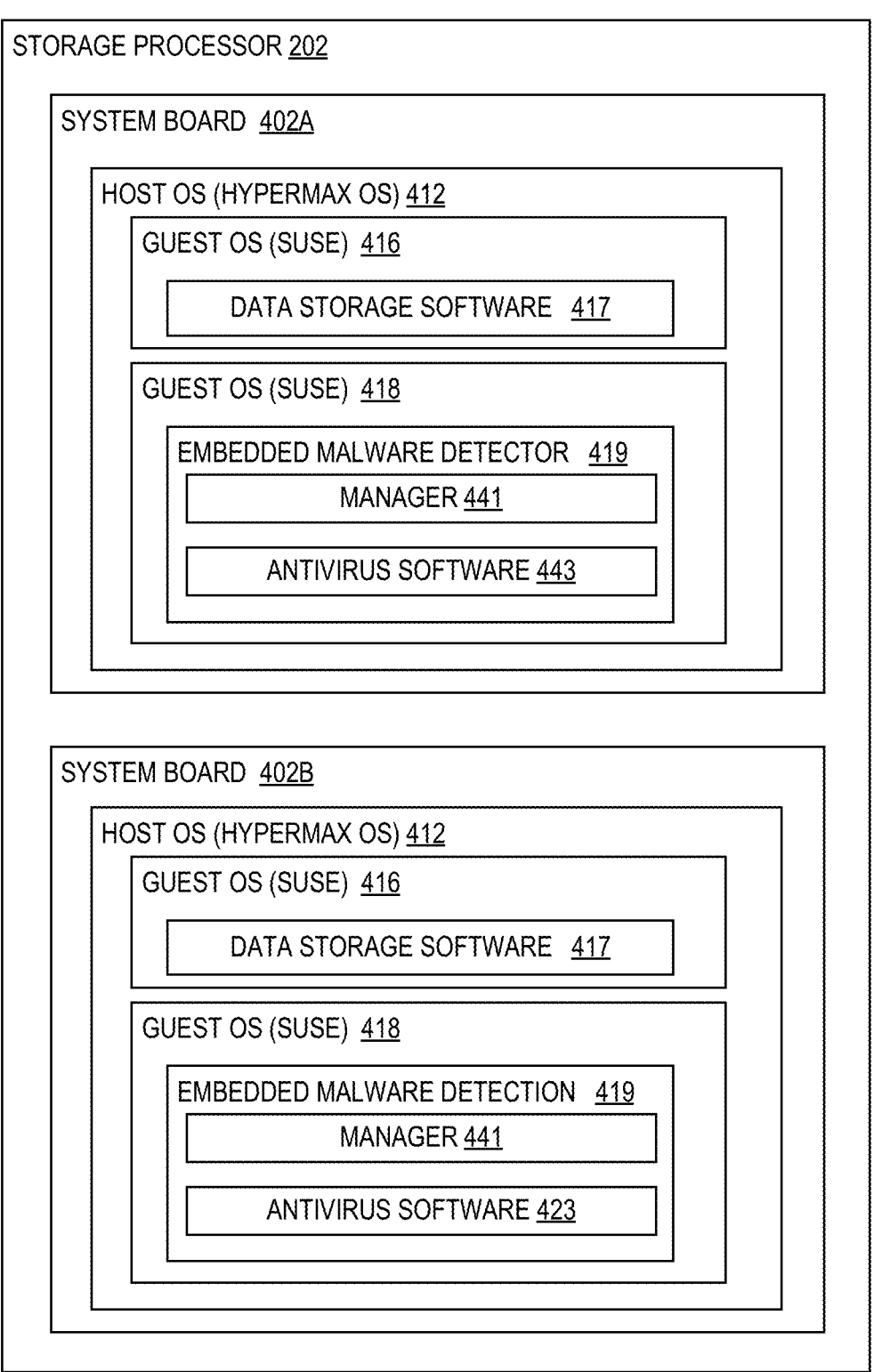
FIG. 4 is a diagram of an example of a storage processor, according to aspects of the disclosure.

FIG. 4 is a diagram of a storage processor 202, according to one possible implementation. The storage processor 202 may be the same or similar to any (or each) of the storage processors 202A-N, which are discussed above with respect to FIG. 2. As illustrated, storage processor 202 may include system boards 402A and 402B. Each of system boards 402A and 402B may include a motherboard, a processor (e.g., an x86 processor or a MIPS processor, etc.), a memory (e.g., Double Data Random Access Memory (DDRAM), etc.), and/or any other suitable type of component. Each of the system boards 402A and 402B may be configured to execute a respective host operating system (OS) 412. Inside each respective host operating system 412, one or more first guest operating systems 416 may be executed together with at least one second guest operating system 418. According to the present example, each of the guest operating systems 416 and 418 is a build of the SUSE Linux Operating System. However, the present disclosure is not limited to using any specific type of operating system (or container) in place SUSE Linux.

Inside each instance of guest OS 416, data storage software 417 may be executed. The data storage software 417 may include any suitable type of software that is configured to store and retrieve data from storage system 133. In one example, software 417 may be configured to execute read requests by retrieving data from any of storage devices 135 and returning the retrieved data to the user or entity that submitted the request. In another example, software 417 may be configured to execute write requests by writing data to any of the storage devices 135. Additionally or alternatively, in some implementations, the software 417 may include a network-attached storage (NAS) server. The NAS server may host one or more file systems for accessing respective data volumes. The NAS servers may act as a file server, and it may have access to shared system resource pools of so that they can easily consume system resources for both performance and capacity. The NAS server may be given its own Internet Protocol (IP) address. Although FIG. 4 depicts each of the host operating systems 412 as executing only one guest OS 416, it will be understood that in most practical applications, each of host operating systems 412 would execute a plurality of instances of the guest OS 416, with each guest OS 416 executing a respective instance of the software 417.

Inside each instance of guest OS 418, an embedded malware detector 419 may be executed. The embedded malware detector 419 may include a manager 441 and an antivirus software 443. According to the present example, the antivirus software 443 includes a version of the ClamAV™ antivirus software. However, the present disclosure is not limited to any specific antivirus software being used. In one example, antivirus software 443 may be configured to: (i) receive from manager 441 a request to perform a scan of a snapshot of one of storage devices 135 that is mounted in guest OS 418, (ii) execute the request by performing the scan, and (iii) provide manager 441 with an indication of the outcome of the scan. The indication of the outcome of the scan may indicate whether any malware was discovered as a result of the scan. Furthermore, if malware was discovered as a result of the scan, the indication of the outcome of the scan may include any suitable information that is customarily reported by antivirus software under such circumstances. For example, the indication may include one or more of an identifier of the malware, identification of one or more processes that are associated with the malware, identification of one or more files that are associated with the malware, and so forth. In some implementations, antivirus software 443 may scan the snapshot of one of storage devices 135 by comparing the data in the snapshot to a database of signature for different malware. The term "malware" may encompass any unauthorized software, including, but not limited to, a virus, spyware, ransomware, backdoor software, software for stealing data, etc.

Manager 441 may include a software layer that is executed over the antivirus software 423. In one example, manager 441 may include a user interface for receiving user input specifying when the embedded malware detector should be executed. For example, the user input may be received via a secure shell, such as SSH. The user input may specify when the embedded detector 419 should scan one or more storage devices 135 and/or what storage devices 135 should be scanned. For example, the user input may specify that the embedded malware detector should scan a particular storage device 135 twice a day or scan the storage device 135 continuously (i.e., on a loop, etc.). In response to the user input, manager 441 may cause the embedded malware detector 419 to scan the storage device 135 at the specified frequency. In some implementations, the storage device 135 may be scanned by executing the process 500, which is discussed further below with respect to FIG. 5. Although, in the present example, manager 441 and antivirus software 443 are depicted as separate blocks, it will be understood that in some implementations they may be integrated with each other.

As noted above, FIG. 4 shows an example of one possible implementation of the storage processors in storage system 133. Storage system 133 may receive I/O requests from the computing devices 130 and execute those requests by reading and/or writing data to the storage devices that are part of storage system 133. Under the nomenclature of the present disclosure, the computing devices 130 are an example of a "host device". As noted above, host devices can execute malware detection software, but this software is vulnerable to being disabled or otherwise rendered ineffective by the malware it is intended to detect. In this regard, the embedded malware detector 419 can supplement (or possibly replace) the functionality of any malware detection software that is executed on the computing devices 130.

FIG. 4 is provided to illustrate the idea of having a separate container (e.g., guest OS 418 in the example of FIG. 4) on any of the storage processors in a storage system, which is configured to execute an embedded malware detector (e.g., the detector 419 in the example of FIG. 4). The container may be executed concurrently with other containers that are executed on the storage processor (e.g., guest operating systems 416), which are configured to execute I/O requests that are incoming to the storage system. As noted above, this approach to detecting malware is advantageous because it is resistant (or ideally immune) to the possibility of the embedded malware detector being disabled by malware executing on the storage device whose snapshot is scanned by the embedded malware detector.

Furthermore, there are several additional advantages associated with using the embedded malware detector 419. In one aspect, malware detector 419 maximizes the functionality of storage system 133 by utilizing features such as the ability to execute guest operating systems and create snapshots. This enables malware detector 419 to operate seamlessly in the background within a guest operating system without causing any discernible impact on the operation of storage system 133. This in effect offloads performance hits caused by traditional host-based malware detectors. As is well known, the execution of malware detectors on host devices reduces the performance of the host devices because they tend to have less robust processing capabilities than the storage processors in a storage system.

In another aspect, the embedded malware detector 419 is fortified against traditional attack vectors, which renders it resistant to common security threats. In some respects, a snapshot of a storage device that is scanned by malware detector 419 may be mounted in the guest OS 418 with read-only privileges, which prevents any malware that is present in the snapshot from being executed and/or disabling the malware detector 419.

In yet another aspect, malware detector 419 may be able to scan any identifiable volume filesystem, irrespective of the type of operating system that is used to implement guest OS 418. Being operating-system-agnostic allows detector 419 to operate efficiently across diverse environments, which in turn makes it a more economical solution for detecting malware compared to traditional methods. In yet another aspect, using malware detector 419 minimizes the need for extensive data traffic that would need to occur if a storage device 135 were to be scanned by malware detection software that is executed on a host device, such as any of the computing devices 130.

Figure 5:
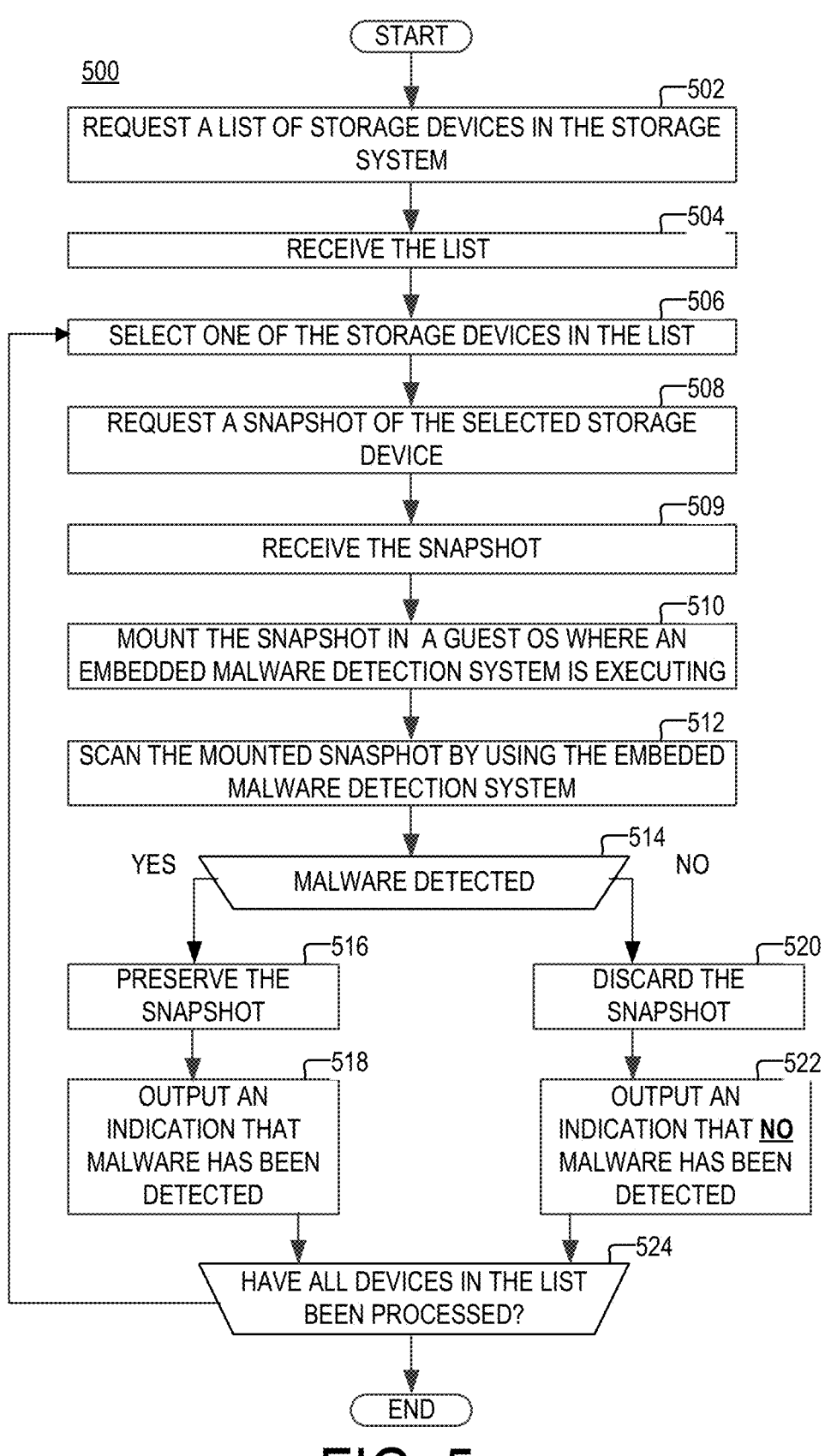
FIG. 5 is a flowchart of an example of a process, according to aspects of the disclosure.

FIG. 5 is a flowchart of an example of a process 500, according to aspects of the disclosure. According to the example of FIG. 5, process 500 is executed by detector 419. However, the present disclosure is not limited to any specific entity or set of entities executing process 500.

At step 502, detector 419 requests list 139 from the management system 132. As noted above, list 139 may include identifiers of those ones of storage devices 135 that are desired to be scanned by detector 419.

At step 504, detector 419 receives the list 139 from the management system 132.

At step 506, detector 419 selects one of the storage devices 135 in the list 139, which has not been selected before during a previous iteration of steps 506-524.

At step 508, detector 419 requests a snapshot of the selected storage device 135. According to the present example, requesting the snapshot request may include generating a snapshot request that includes the identifier of the selected storage device and transmitting the snapshot request to management system 132. In another example, requesting the snapshot may include placing an API call for the creation of the snapshot which includes the identifier of the selected storage device 135 as one of its parameters. The API call may be executed by the management system 132 and/or one of the storage processors in storage system 133.

At step 509, detector 419 receives the snapshot. According to the present example, receiving the snapshot includes receiving a link to the snapshot. However, alternative implementations are possible in which the snapshot itself is received.

At step 510, detector 419 mounts the snapshot in the instance of the guest OS that is executing detector 419 (e.g., guest OS 418 that is shown in FIG. 4). In some implementations, mounting the snapshot may include discovering a filesystem of the snapshot (or the device 135 that is selected at step 506) and executing a mount command. After the snapshot is mounted, the snapshot appears as another volume that is available in the guest OS. Additionally or alternatively, in some implementations, upon discovering the file system, detector 419 may determine whether the file system is supported by guest OS 418. If the file system is supported, detector 419 may mount the snapshot in guest OS 418. Otherwise, if the file system is not supported, detector 419 may output an error after which process 500 may proceed to step 524. In some implementations, the file system of the snapshot (or the storage device 135 that is selected at step 506) may be determined by examining metadata associated with the snapshot or in any other suitable manner.

At step 512, detector 419 scans the mounted snapshot. In instances in which detector 419 includes the manager 441 and antivirus software 443, scanning the mounted snapshot may include: (i) providing, by manager 441, antivirus software 443 with an instruction to perform a scan of the snapshot, (ii) performing, by antivirus software 443, the scan in response to the instruction, and (iii) returning, by antivirus software 443 to manager 441, an indication of the outcome of the scan.

At step 514, detector 419 determines if any malware has been detected as a result of the scan. In instances in which detector 419 includes the manager 441 and antivirus software 443, manager 441 may process the indication of the outcome of the scan that is provided by antivirus software 443 to determine if antivirus software 443 has detected any malware on the mounted snapshot. If malware has been detected, process 500 proceeds to step 516. Otherwise, if no malware is detected, process 500 proceeds to step 520.

At step 516, detector 419 preserves the snapshot (received at step 509). In some implementations, "preserving the snapshot" may include leaving the snapshot as is, without deleting it. Additionally or alternatively, in some implementations, preserving the snapshot may include transmitting to management system 132 an instruction to keep the snapshot in storage indefinitely (or until further notice). In some respects, preserving the snapshot may include taking any action that would permit the snapshot to remain available for further analysis by security experts.

At step 518, detector 419 outputs for presentation to a user an indication that malware has been detected. Outputting the indication may include displaying the indication on a display device, transmitting the indication over a communications network to a remote device, or storing the indication in a database or another similar location. In some implementations, the indication that is output may include any information that is reported by the antivirus software 443, such as an identifier of the malware or identifiers of files that are infected. Additionally or alternatively, the indication may include or more of an identifier of the storage device 135 (selected at step 506), an identifier of the snapshot (received at step 509), and/or an indication of the storage location where the snapshot is stored. As used herein, the term "snapshot identifier" shall refer to any number, string, or alphanumerical string that identifies a snapshot of a storage device uniquely from other snapshots of the same storage device.

At step 520, detector 419 discards the snapshot (received at step 509). In some implementations, "discarding the snapshot" may include leaving the snapshot as is, thus allowing the snapshot to be deleted by default (by management system 132) as part of storage reclamation policies that are implemented by management system 132. Additionally or alternatively, in some implementations, discarding the snapshot may include deleting the snapshot and/or transmitting to management system 132 an instruction to delete the snapshot.

At step 522, detector 419 outputs for presentation to a user an indication that no malware has been detected. Outputting the indication may include displaying the indication on a display device, transmitting the indication over a communications network to a remote device, or storing the indication in a database or another similar location. In some implementations, the indication that is output may include any information that is reported by the antivirus software

443. Additionally or alternatively, the indication may include or more of an identifier of the storage device 135 (selected at step 506), an identifier of the snapshot (received at step 509), and/or an indication of the storage location where the snapshot is stored.

At step 524, detector 419 determines if all storage devices 135 in the list (received at step 504) have been processed. If all storage devices 135 have been processed, process 500 ends. Otherwise, process 500 returns to step 506 where another one of the storage devices on the list is selected.

In some implementations, the snapshot created at steps 508-509 may be different from the snapshots in the snapshot sets 136. The snapshots in the snapshot sets 136 may be created in accordance with respective point-in-time schedules (or policies) that are implemented as part of data protection mechanisms in storage system 133. By contrast, the snapshot created at steps 508-509 may be created upon a request from the detector 419, which is submitted when detector 419 is ready to perform a scan. Alternatively, in some implementations, instead of creating a new snapshot at steps 508-509, detector 419 may obtain the most recent snapshot of the storage device 135 (selected at step 506), which is part one of the snapshot sets 136.

According to the present example, at steps 502-504, detector 419 receives list 139, which identifies those ones of storage devices 135 that are desired to be scanned. As noted above, in an alternative implementation, list 139 may identify those ones of storage devices 135 that are exempt from being scanned. In such instances, to identify the storage devices 135 that need to be scanned, detector 419 may first query the management system 132 to identify all storage devices 135 that are available in the storage system 133 and subsequently retrieve the list 139 to determine which of the storage devices 135 need not be scanned. Additionally or alternatively, in some implementations, steps 502-504 may be omitted. In such implementations, instead of selecting a storage device 135 from a list (at step 506), detector 419 may receive user input identifying one of the storage devices 135 that is desired to be scanned.

FIGS. 1-5 are provided as an example only. In some embodiments, the term "I/O request" or simply "I/O" may be used to refer to an input or output request. At least some of the steps discussed with respect to FIGS. 1-5 may be performed in a different order or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The acronym RAID, as used throughout the disclosure, means "Redundant Array of Independent Disks".

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments. (1/23)

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
executing an embedded malware detector, the embedded malware detector being executed inside a first guest operating system, the first guest operating system being executed on a storage processor that is part of a storage system, the storage processor being configured to execute one or more second guest operating systems in addition to the first guest operating system, each of the second guest operating systems being arranged to execute software for reading and/or writing data to one or more storage devices that are provided in the storage system;
identifying, by the embedded malware detector, a given one of the storage devices;
obtaining, by the embedded malware detector, a snapshot of the given one of the storage devices, wherein the snapshot is created independently of one or more policies for point-in-time snapshot creation;
mounting, by the embedded malware detector, the snapshot in the first guest operating system;
scanning the mounted snapshot for malware, the snapshot being scanned by using the embedded malware detector; and
preserving the mounted snapshot for further inspection and outputting an alert in response to the mounted snapshot being found to be infected with malware, and deleting the snapshot in response to the snapshot being not found to be infected with malware.

2. The method of claim 1, wherein identifying the given storage device includes receiving, from a management system, a list of storage devices in the storage system that are designated for monitoring by the embedded malware detector, and selecting the given storage device from the list.

3. The method of claim 1, wherein obtaining the snapshot includes requesting the snapshot from a management system.

4. The method of claim 1, wherein the software for reading and/or writing data includes a network accessible storage (NAS) server.

5. The method of claim 1, wherein the embedded malware detector includes a manager and an antivirus software, the manager being configured to: obtain the snapshot, mount the snapshot, and issue a command to the antivirus software, which, when executed by the antivirus software, causes the antivirus software to scan the mounted snapshot.

6. The method of claim 1, wherein the first guest operating system and each of the second operating systems are executed inside a host operating system.

7. The method of claim 1, wherein outputting the alert includes one or more of transmitting the alert over a communications network and displaying the alert on a display device.

8. A storage processor that is part of a storage system, the storage system being configured to provide one or more storage devices, comprising:
a memory; and
at least one processor that is operatively coupled to the memory, the at least one processor being configured to perform the operations of:
executing an embedded malware detector inside a first guest operating system, the first guest operating system being executed on the storage processor together with one or more second guest operating systems, each of the second guest operating systems being arranged to execute software for reading and/or writing data to one or more storage devices that are provided in the storage system;
identifying, by the embedded malware detector, a given one of the storage devices;
obtaining, by the embedded malware detector, a snapshot of the given one of the storage devices, wherein the snapshot is created independently of any policies for point-in-time snapshot creation that are associated with the given storage device;
mounting, by the embedded malware detector, the snapshot in the first guest operating system;
scanning the mounted snapshot for malware, the snapshot being scanned by using the embedded malware detector;
preserving the mounted snapshot for further inspection and outputting an alert in response to the mounted snapshot being found to be infected with malware, and deleting the snapshot in response to the snapshot being not found to be infected with malware.

9. The system of claim 8, wherein identifying the given storage device includes receiving, from a management system, a list of storage devices in the storage system that are designated for monitoring by the embedded malware detector, and selecting the given storage device from the list.

10. The system of claim 8, wherein obtaining the snapshot includes requesting the snapshot from a management system.

11. The system of claim 8, wherein the software for reading and/or writing data includes a network accessible storage (NAS) server.

12. The system of claim 8, wherein the embedded malware detector includes a manager and an antivirus software, the manager being configured to: obtain the snapshot, mount the snapshot, and issue a command to the antivirus software, which, when executed by the antivirus software, causes the antivirus software to scan the mounted snapshot.

13. The system of claim 8, wherein the first guest operating system and each of the second operating systems are executed inside a host operating system.

14. The system of claim 8, wherein outputting the alert includes one or more of transmitting the alert over a communications network and displaying the alert on a display device.

15. A non-transitory computer-readable medium storing one or more processor executable instructions, which, when executed by at least one processor of a storage processor, cause the at least one processor to perform the operations of:

executing an embedded malware detector inside a first guest operating system, the first guest operating system being executed on the storage processor together with one or more second guest operating systems, each of the second guest operating systems being arranged to execute software for reading and/or writing data to one or more storage devices that are provided in a storage system;

identifying, by the embedded malware detector, a given one of the storage devices;

obtaining, by the embedded malware detector, a snapshot of the given one of the storage devices wherein the snapshot is created independently of one or more policies for point-in-time snapshot creation;

mounting, by the embedded malware detector, the snapshot in the first guest operating system;

scanning the mounted snapshot for malware, the snapshot being scanned by using the embedded malware detector;

preserving the mounted snapshot for further inspection and outputting an alert in response to the mounted snapshot is found to be infected with malware, and deleting the snapshot in response to the snapshot being not found to be infected with malware.

16. The non-transitory computer-readable medium of claim 15, wherein the software for reading and/or writing data includes a network accessible storage (NAS) server.

* * * * *